(12) United States Patent
Hansen et al.

(10) Patent No.: US 12,417,301 B2
(45) Date of Patent: Sep. 16, 2025

(54) SECURE DATA EXCHANGE

(71) Applicant: GENEIAL LLC, Missouri City, TX (US)

(72) Inventors: Adam Wesley Hansen, Missouri City, TX (US); Christopher Glenn Hansen, Provo, UT (US)

(73) Assignee: GENEIAL LLC, Missouri City, TX (US)

( * ) Notice: Subject to any disclaimer, the term of this patent is extended or adjusted under 35 U.S.C. 154(b) by 199 days.

(21) Appl. No.: 18/006,850

(22) PCT Filed: Jul. 27, 2021

(86) PCT No.: PCT/US2021/043340
§ 371 (c)(1),
(2) Date: Jan. 25, 2023

(87) PCT Pub. No.: WO2022/026484
PCT Pub. Date: Feb. 3, 2022

(65) Prior Publication Data
US 2023/0315875 A1    Oct. 5, 2023

Related U.S. Application Data

(60) Provisional application No. 63/133,477, filed on Jan. 4, 2021, provisional application No. 63/057,415, filed on Jul. 28, 2020.

(51) Int. Cl.
*G06F 21/00* (2013.01)
*G06F 21/60* (2013.01)
*G06F 21/62* (2013.01)

(52) U.S. Cl.
CPC .......... *G06F 21/606* (2013.01); *G06F 21/602* (2013.01); *G06F 21/6218* (2013.01)

(58) Field of Classification Search
CPC .. G06F 21/606; G06F 21/602; G06F 21/6218; H04L 9/008
See application file for complete search history.

(56) References Cited

U.S. PATENT DOCUMENTS 9,691,090 B1    6/2017 Barday
2002/0065825 A1    5/2002 Kassan et al.
(Continued)

FOREIGN PATENT DOCUMENTS

WO    2017/096590 A1    6/2017

OTHER PUBLICATIONS

Ding, Wenxiu, Zheng Yan, and Robert H. Deng. "Encrypted data processing with homomorphic re-encryption." Information Sciences 409 (2017): 35-55. (Year: 2017).*

(Continued)

*Primary Examiner* — Ka Shan Choy
(74) *Attorney, Agent, or Firm* — MASCHOFF BRENNAN

(57) ABSTRACT

The present disclosure generally relates to the secure exchange of data. In some implementations, an example method involves receiving data from a number of independent data sources. The method also includes storing the data in a central repository where at least a first portion of the data is homomorphically encrypted, receiving a data request from a data requester, and analyzing the stored data without decrypting the homomorphically encrypted data to determine an aggregated subset of data relevant to the data request. The aggregated subset of data may include at least some of the homomorphically encrypted data. The method also includes providing data request results that include or are derived from the aggregated subset of data to the data requester.

24 Claims, 4 Drawing Sheets

(56) References Cited

U.S. PATENT DOCUMENTS

| | | | |
|---|---|---|---|
| 2002/0082977 | A1 | 6/2002 | Hammond et al. |
| 2002/0143659 | A1* | 10/2002 | Keezer .............. G06Q 30/0641 |
| | | | 707/E17.116 |
| 2003/0026431 | A1 | 2/2003 | Hammersmith |
| 2007/0101123 | A1* | 5/2007 | Kollmyer ........... H04N 21/8193 |
| | | | 348/E7.056 |
| 2008/0077557 | A1 | 3/2008 | Schneider et al. |
| 2011/0264920 | A1* | 10/2011 | Rieffel .................... H04L 9/008 |
| | | | 713/189 |
| 2012/0041970 | A1* | 2/2012 | Ghosh ................... H04L 67/568 |
| | | | 707/769 |
| 2012/0087495 | A1 | 4/2012 | Revell |
| 2014/0032259 | A1 | 1/2014 | LaFever et al. |
| 2014/0280327 | A1* | 9/2014 | Pham ..................... G16B 30/00 |
| | | | 707/770 |
| 2015/0310188 | A1 | 10/2015 | Ford et al. |
| 2015/0317563 | A1 | 11/2015 | Soares et al. |
| 2016/0105402 | A1* | 4/2016 | Soon-Shiong .......... H04L 9/008 |
| | | | 713/164 |
| 2016/0335393 | A1 | 11/2016 | Pham et al. |
| 2017/0041296 | A1 | 2/2017 | Ford et al. |
| 2017/0052976 | A1 | 2/2017 | Verma et al. |
| 2017/0331763 | A1 | 11/2017 | Li et al. |
| 2018/0046753 | A1 | 2/2018 | Shelton |
| 2018/0212933 | A1* | 7/2018 | Williams ............. H04L 9/0643 |
| 2018/0294950 | A1 | 10/2018 | Khedr et al. |
| 2019/0182216 | A1 | 6/2019 | Gulak et al. |
| 2019/0243979 | A1* | 8/2019 | De Gaetano .......... G06F 21/604 |
| 2020/0082126 | A1 | 3/2020 | Brown et al. |
| 2020/0084187 | A1* | 3/2020 | Bouaziz ............. H04L 63/0853 |
| 2020/0327250 | A1 | 10/2020 | Wang et al. |
| 2020/0382510 | A1 | 12/2020 | Dunjic et al. |
| 2021/0111863 | A1 | 4/2021 | Trivedi et al. |
| 2022/0261497 | A1* | 8/2022 | Barday .................. G06F 21/604 |
| 2024/0048354 | A1 | 2/2024 | Jung et al. |
| 2024/0160771 | A1 | 5/2024 | Hansen et al. |

OTHER PUBLICATIONS

European Search Report, as issued in connection with European Application No. 21849384.9, dated Jul. 16, 2024, 8 pgs.

Alfoui et al., "Computing Blindfolded on Data Homomorphically Encrypted under Multiple Keys: An Extended Survey", arxiv.org, Cornell University Library, 201 Olin Library Cornell University Ithaca, NY 14853, Jul. 18, 2020, XP081723266, sections 1 and 4.2, pp. 1-55.

International Search Report and Written Opinion, as issued in connection with International Patent Application No. PCT/US2021/043340, mailed Nov. 4, 2021, 14 pgs.

International Search Report and Written Opinion, as issued in connection with International Patent Application No. PCT/US2022/047063, mailed Feb. 7, 2023, 6 pgs.

International Search Report and Written Opinion, as issued in connection with International Patent Application No. PCT/US2022/071369, mailed Jun. 16, 2022, 9 pgs.

European Search Report, as issued in connection with European Application No. 22782388.7, dated Jan. 23, 2025, 10 pgs.

Arampatzis, "Homomorphic Encryption: What Is It and How Is It Used", Venafi, Jan. 22, 2020, retrieved on Sep. 30, 2021 from https://www.venafi.com/blog/homomorphic-encryption-what-it-and-how-it-used, 15 pgs.

Jung et al., "HEAAN Demystified: Accelerating Fully Homomorphic Encryption Through Architecture-centric Analysis and Optimization", ARXIV.org, Cornell University Library, Mar. 10, 2020, 14 pgs.

Khedr et al., "SecureMed: Secure Medical Computation using GPU-Accelerated Homomorphic Encryption Scheme", IACR, International Association for Cryptologic Research, vol. 20160506:075900, May 5, 2016, 9 pgs.

Ozdemir et al., "Secure data aggregation in wireless sensor networks: A comprehensive overview", Computer Networks 53.12 (2009): pp. 2022-2037.

Prakash et al., "Rapid Memory-Aware Selection of Hardware Accelerators in Programmable SoC Design", IEEE Transactions on Very Large Scale Integration (VLSI) Systems 26, No. 3 (2017): pp. 445-456.

Reis et al., "Computing-in-memory for performance and energy-efficient homomorphic encryption", IEEE Transactions on Very Large Scale Integration (VLSI) Systems 28, No. 11 (2020): pp. 2300-2313.

Riazi et al., "HEAX: An Architecture for Computing on Encrypted Data", Proceedings of the Twenty-Fifth International Conference on Architectural Support for Programming Languages and Operating Systems, Mar. 9, 2020, pp. 1295-1309.

Shafagh et al., "Secure Sharing of Partially Homomorphic Encrypted IoT Data", Embedded Network Sensor Systems, ACM, Nov. 6, 2017, 14 pgs.

\* cited by examiner

SECURE DATA EXCHANGE

CROSS REFERENCE TO RELATED APPLICATIONS

The subject application claims priority to U.S. Provisional Patent Application No. 63/057,415 filed Jul. 28, 2020 and U.S. Provisional Patent Application No. 63/133,477 filed Jan. 4, 2021. The contents of these applications are incorporated herein by reference in their entirety.

FIELD

The present disclosure generally relates to secure data exchange.

BACKGROUND

Unless otherwise indicated herein, the materials described herein are not prior art to the claims in the present application and are not admitted to be prior art by inclusion in this section.

All types of data in numerous different fields is being generated throughout the world. Similarly, significant amounts of data are being aggregated and stored in various repositories throughout the world, including those which are commercially or governmentally managed or held. Within a given field, the accumulated data may be used in aggregate by individual repositories for various purposes. For example, in the case of genomic data, private and public repositories are utilized for discovery of disease-gene associations and potential drug targets, identification of candidates for enrollment in clinical trials, and reclassification of variants of uncertain significance (VUS) as pathogenic or benign, amongst other possibilities. The repositories may include genomic sequencing data for millions of individuals worldwide.

In parallel with the development of these different, and often isolated, data resources, there is often a demand for increased sample size by potential users of the data. Individual repositories can increase their sample size, but eventually their growth will plateau or level off as these repositories saturate in size due to market reach or political boundaries. In addition, data in a single repository may presently be individually queried, but the data in numerous repositories may not be queried together. In the latter instance, the ability to query or analyze data across disparate repositories would allow for greater power and value relative to a corresponding data request of any single repository due to increased sample size and genetic diversity. However, data sharing across repositories is not currently employed due to a number of drawbacks, including for example the common need of maintaining data privacy, whether due to legal obligations (e.g., to protect individual-level data) or business concerns. For example, searching across numerous independent data sources is not possible without compromising privacy by exposing unencrypted data to external parties.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example embodiment, a method includes receiving data from a number of independent data sources. The method further includes storing the data in a central repository where at least a first portion of the data is homomorphically encrypted, receiving a data request from a data requester, and analyzing the stored data without decrypting the homomorphically encrypted data to determine an aggregated subset of data relevant to the data request. The aggregated subset of data may include at least some of the homomorphically encrypted data. The method also includes providing data request results that include or are derived from the aggregated subset of data to the data requester.

In another embodiment, a system includes one or more processors and one or more non-transitory computer-readable media containing instructions which, in response to being executed by the one or more processors, cause the system to perform or control performance of various operations. The operations include receiving data from a number of independent data sources. The operations further include storing the data in a central repository where at least a first portion of the data is homomorphically encrypted, receiving a data request from a data requester, and analyzing the stored data without decrypting the homomorphically encrypted data to determine an aggregated subset of data relevant to the data request. The aggregated subset of data includes at least some of the homomorphically encrypted data. The operations also include providing data request results that include or are derived from the aggregated subset of data to the data requester.

In still another embodiment, one or more non-transitory computer-readable media contain instructions which, in response to being executed by one or more processors, cause a system to perform or control performance of operations that include receiving data from a number of independent data sources. The operations further include storing the data in a central repository where at least a portion of the data is homomorphically encrypted, receiving a data request from a data requester, and analyzing the stored data without decrypting the homomorphically encrypted data to determine an aggregated subset of data relevant to the data request. The aggregated subset of data includes at least some of the homomorphically encrypted data. The operations also include providing data request results that include or are derived from the aggregated subset of data to the data requester.

In still another embodiment, a method includes receiving a data request from a data requester; identifying from the data request received from the data requester one or more types of data for which presence may be determined by a number of independent data sources; providing the identified one or more types of data to the number of independent data sources for determining presence of the identified one or more types of data; receiving from at least one of the number of independent data sources data corresponding to the identified one or more types of data; and aggregating the data received from each of the independent data sources and providing the aggregated data to the data requester.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
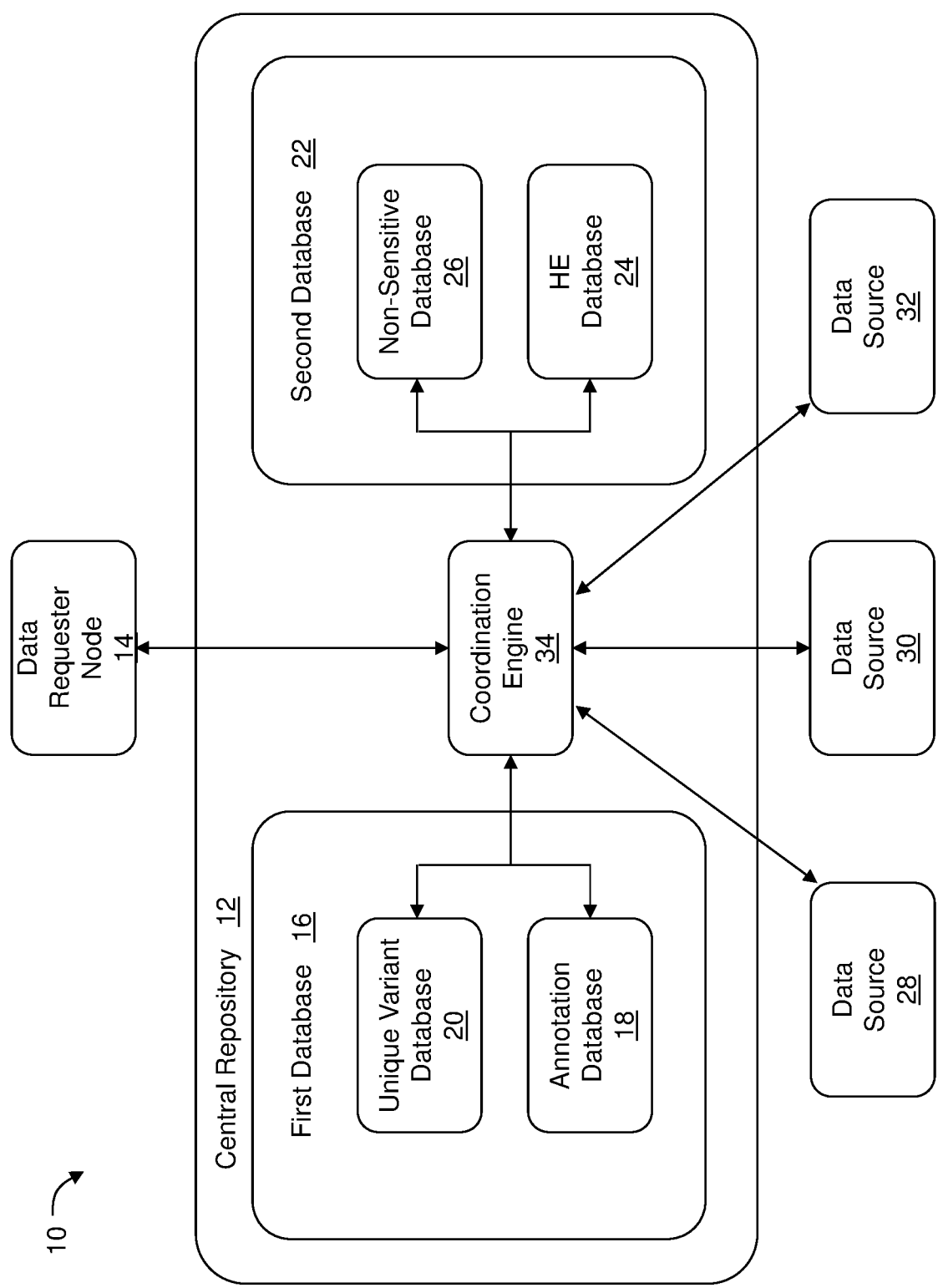
FIG. 1 is a schematic illustration of a system for exchanging data.

The present disclosure generally relates to secure data exchange. More particularly, but not exclusively, the present disclosure relates to systems and methods for facilitating analysis of data from one or more independent data sources to identify data relevant to an external party, such as a data requester, without revealing sensitive information contained in the data. The data requester may provide a data request, and the request may include queries, statistical analyses or tests, and/or training machine learning models, just to provide a few examples.

In some implementations, the present disclosure facilitates aggregate querying or analysis across data provided by multiple independent data sources while maintaining the privacy and security of each independent data source. The data may include, for example, genomic data; structured or unstructured phenotypic data such as data derived from human or other tissue samples and associated metadata, electronic medical and health records and derivatives thereof or therefrom, demographic information, medical diagnostic and billing codes (ICD codes, CPT codes), terms from computational ontologies (Human Phenotype Ontology/HPO terms), patient-reported data, health data generated by wearables or sensors, family history data, and medical imaging raw data or downstream derivative features; internet of things and smart home data stores; autonomous vehicle data; financial data; transaction data; location data; photographic data; video data; and metadata cataloguing physical products, goods, items, or services.

Genomic data may refer to data directly generated by sequencing or other nucleic acid genotyping technology, nucleic acid quantification, proteomic data generated through mass spectrometry (with or without liquid chromatography), and any and all downstream derivatives of these data, whether independently derived or analyzed jointly with other data types. In some implementations, genomic data may be derived from samples of tissues of living material, or in the field of microbiology, from an environmental sample. Microbiome may refer to the collection of microorganisms including, but not limited to, bacteria, archaea, fungi, protozoa, viruses, and phage, or more generally, to their relative abundances, detected in any sample.

In some implementations, an aggregate, privacy-preserving transactional marketplace for data where vendors make products, goods, items, or services available on a transactional basis on provider-specified or marketplace-controlled terms may also be provided.

In some implementations, data from a number of independent data sources may be received and aggregated in a central repository. The data received from the independent data sources, or at least a portion thereof, may be encrypted before it is received and stored in the central repository, or it may be encrypted after its receipt and before it is stored in the central repository. In one aspect, a toolkit may be provided to the independent data source(s) and the toolkit may be used by the independent data source(s) to encrypt data before it is received. In some implementations, the data which is encrypted may be homomorphically encrypted, and the homomorphic encryption may occur before the data is received and stored. By way of example, all or part the encrypted data stored may be fully homomorphically encrypted (FHE) or all or part of the encrypted data stored may be partially homomorphically encrypted. Generally speaking, homomorphic encryption facilitates mathematical operations to be performed on encrypted data, resulting in an encrypted and therefore private output. As such, a third party external to the independent data sources and the central repository may analyze sensitive data aggregated from the independent data sources without the sensitive contents of the data being revealed. Similarly, the central repository may provide a trusted approach for querying or analyzing domain-specific data, powered by homomorphic encryption, enabling the independent data sources to participate in data exchange on their own terms. Similarly, the independent data sources may securely sell specific data entries without exposing their entire data asset to the data requester(s).

Data requests, including queries or analyses for example, may be received from a third party, such as a data requester, and the data requests may be run against the aggregate data stored in the central repository without decrypting the data. In some implementations, after the data has been analyzed and the data requester determines at least some portion of the data is relevant or valuable for their objectives, an encrypted result including the portion of the data deemed relevant to the third party may be delivered to the data requester, and one-time decryption keys may be passed from the independent data sources responsible for providing the respective data to the data requester. In some implementations, a request for the encrypted result including the portion of the data deemed relevant to the third party may be delivered to the one or more independent data sources through the central repository, the encrypted result may be provided through the central repository to the data requester, and the one-time decryption key may also be provided by the one or more independent data sources to the data requester through the central repository.

Alternatively or additionally, each independent data source responsible for providing the data to the central repository that is included within the data deemed relevant to the data requester may be determined, and the independent data sources may be notified of such determination along with an identification of the respective data each has provided that is included in the data deemed relevant to the data requester. Each independent data source so notified may decrypt its relevant data and then re-encrypt its relevant data with a public key provided by the data requester. The re-encrypted data may be returned to and received by the central repository, and the re-encrypted data may be provided to the data requester from the central repository for decryption with a private key corresponding to the public key.

In some implementations, the independent data sources may each encrypt data with a common homomorphic encryption algorithm, although potentially with separate keys, or with one or more unique, secret transformation functions applied to their data before or after encryption. These data may then be aggregated at the central repository into a single database with a consistent schema such as a set of columns or fields, with rows potentially encrypted with different keys, based on the original independent data source of origin. Information regarding the independent data source of origin for particular data may be unencrypted or encrypted, with or without homomorphic encryption. Queries, analysis, or other mathematical operations performed against this aggregate database may yield encrypted output data, with keys for decryption dependent on the specific rows returned and the key used to encrypt those rows, or if a single key is used together with unique, secret transformation functions applied to the data, the corresponding function to reverse each respective transformation may be applied. In the case where aggregate functions are applied across multiple rows, returning a function of multiple rows, the decryption key or transformation function corresponding to each individual row contributing to the aggregate function may be provided to decrypt the final output.

Optionally, automatic or manual decryption, or transmission of encrypted data along with a relevant one-time decryption key, included in the data deemed relevant to the data requester, may be performed in response to receiving confirmation of completion of a financial transaction. For example, in response to receiving confirmation of completion of a financial transaction, an independent data source may decrypt certain data and re-encrypt that data with a public key provided by the data requester. Alternatively, in response to receiving confirmation of completion of a financial transaction, an independent data source may deploy one-time keys for decrypting data to the data requester. In some implementations, this function may be enforced through the utilization of smart contracts which implement computer protocols intended to digitally facilitate, verify, or enforce the negotiation or performance of a contract. These computer protocols may facilitate the transfer of digital assets between parties under agreed-upon stipulations or terms. In other words, they are agreements to exchange goods, services, or money that will automatically execute, without third party oversight, so long as established criteria are met. They may or may not involve cryptocurrencies or blockchain technology. For example, where standard private keys are used to decrypt data, a smart contract may force an independent data source to decrypt data (so long as the private key is still provided) upon verification that the data is in accordance with pre-determined eligibility criteria, and upon verification that payment has been received from a third party in exchange for access to the decrypted data or data components. However, forms in which smart contracts or blockchain are not used to verify, enforce, or otherwise execute the contract or agreement are also possible.

The data stored in the central repository may be subject to differential encryption where some information is encrypted and some is not, or where different levels of encryption are used with different types of data. For example, in some implementations, a file such as Variant Call Format (VCF) file for example may be analyzed to identify sensitive and non-sensitive data, and only the sensitive data may be homomorphically encrypted.

One or more indexes of the data, including homomorphically encrypted data, stored on the central repository may also be created. An index may be created for individual component encrypted databases or for the aggregate database. In some implementations of indexing, data may first be sorted prior to encryption, then an index may be created as a separate database containing primary keys and pointers to the data. In another form of indexing, data may be sorted after encryption. Indexing may use ordering of values or hash functions, and may be clustered (e.g. primary indexing), non-clustered (e.g. secondary indexing), or multilevel.

A number of precalculated SELECT outputs or fetches of data in the central repository may be generated from asynchronous queries or data requests on homomorphically encrypted data. A server can execute a multitude of various SELECT statements or data retrieval functions against a homomorphically-encrypted database and store the resulting outputs in a lookup table, hash table, distinct database table, or similar structure for faster retrieval later in the event that a similar or exact later query or data request is found to match entries in the prefetched set of outputs. The process of pre-calculating and caching outputs may enable quick functionality when such homomorphically-encrypted data is deployed in real time. In the case of genomic data for example, the locations within the central repository of variants may be precomputed for fast retrieval when they are needed during live data requests. Stated alternatively, the locations of variants or other data may be predetermined and storing the predetermined locations may provide a faster cache or lookup table. These predetermined locations may be indexed while maintaining the privacy and security of customer data, thereby preserving the benefits of homomorphic encryption while further increasing real-world, real-time operating speed.

In another embodiment, with or without utilizing homomorphic encryption, a central node or central repository may receive data requests from one or more data requesters, translate the data requests into a set of all possible resulting data, and pass the modified data requests on to independent data sources. The independent data sources may then execute and log the data requests, and each may independently return their results (as appropriate) to the central node, which in turn returns aggregate results to the data requester. In some implementations, when this embodiment is implemented in connection with genomic data, input filter-based data requests of genomic annotation parameters may first query or analyze an aggregate set of all possible variants (whether universal or specific to a given data set) at the central node. This initial query or analysis may then be translated or decomposed into a set of all possible genomic variants matching input criteria. The independent data sources may then be individually or aggregately queried or analyzed as to whether they contain any samples or instances of individuals harboring genetic variants in the intermediate set. Results may be first returned to the central data request coordinating node prior to aggregate analysis and return of results to the data requester.

In one aspect, the instances of the one or more genetic variants may include genomic and phenotypic data for individuals known to harbor or possess specific genetic variants. However, it is also contemplated that a data request may relate to a query or analysis across aggregate data such as a summary of statistics across a group or "cohort" of people/samples with features (genomic, phenotypic/biomedical, or otherwise) known to match input filter parameters of the data requester(s). For example, a data requester might want to search for people with a specific rare disease, and may also want access to an interactive dashboard of charts, summary statistics, etc., generated from analysis of this 'on-demand cohort' (matching input criteria).

With respect to genomic data for example, translation of the data requests into a set of all possible resulting data may involve a central repository where variant-level and gene-level annotation data (e.g. allele frequency, predicted pathogenicity, known phenotypic associations, gene expression levels, etc.) for all or any number of variants and genes is catalogued. In this form, the central repository may, in combination with sample-level genotypic information, allow for efficient, on-demand annotation of genes and variants downstream of executing SQL-like data requests searching for variants meeting specified criteria. Alongside these annotations, the central repository may include a unique-variant table, initially consisting of all possible single-nucleotide variants (SNVs) (as this is a fixed set of variants) and/or all insertions or deletions of bases (INDELs) previously reported in a large, publicly available population dataset. Scripts may be provided which utilize these variant and annotation databases to decompose a given filter-based genomic data request into an output set of all possible matching variants. These scripts may reduce the complexity of any given data query or request by decomposition into multiple, more basic data requests. Various database design parameters may be adapted to optimize query or analysis performance and speed.

In some implementations, the subject matter disclosed herein may provide rare disease researchers or others with a search engine for variants meeting specified criteria such that a marketplace for genomic and or medical/health data or related tissue samples and associated metadata may be provided. In this implementation, homomorphic encryption libraries may be used to construct a deterministic database capable of performing conjunctive match lookup queries or data requests for generic data given SQL-like syntax. By way of example, variant queries or data requests with complex annotation-based criteria may be executed (e.g., select missense variants where minor allele frequency <0.001, REVEL score> 0.9, and are highly expressed in the lung) and simple variant lookup queries or data requests may be executed. Indexing may be utilized to optimize query or analysis performance. Scripts may encrypt VCF files (genomic variant data) and structured phenotypic data and ingest them into a fully homomorphic encryption (FHE) database.

This or other databases may be implemented alongside a tool that translates genomic filter-based queries or data requests into corresponding sets of possible variants. An unencrypted or non-homomorphically encrypted unique-variant database may be deployed, initially consisting of all possible SNVs, and all INDELs catalogued in the genome aggregation database (gnomAD). An inclusive set of variant-level and gene-level annotations may be curated, aggregated, and formatted. Scripts may utilize these variant and annotation databases to translate and/or decompose a given filter-based genomic query or data request into a set of all possible variants matching input criteria. This query/data request translation and/or decomposition tool may then facilitate annotation filter-based querying or analysis of a homomorphically encrypted genomic database, reducing the computational load of the homomorphically encrypted genomic database.

Homomorphically encrypted query or data request outputs can be decrypted where source data is independently encrypted by independent data providers. The filter-based querying or analysis previously described can return decrypted results from queries or analysis of source data composed of any number of independent genomic or medical/health data repositories. Individual decryption (private) keys remain secret to each data store. Data requests may be routed first through the unencrypted unique-variant database and subsequently through a homomorphically encrypted genomic database corresponding to each data store. The encrypted results from each homomorphically encrypted database may be returned to the respective data store keyholders, which in turn decrypt the results, encrypt the results with a public key provided by the data requester, and securely return the encrypted result to the central server for forwarding to the data requester, who can decrypt it with their private key.

The platform may be portable (e.g. cloud-based and/or containerized) and may allow for data harmonization, or consistent pre-processing of data allowing for interoperability. An encryption key manager may be utilized which may have a capability to issue a series of one-time access keys to decrypt output data from homomorphically encrypted queries. At each independent data store, a standard central repository communication node may be deployed which pushes sensitive data (that may be homomorphically encrypted) and other data (that may have standard encryption) to a centralized coordination service, and receives from the same service both 1) payments and 2) requests to decrypt data given an end-user-data-requester-provided key, or requests that decryption keys be sent to the data requester.

An optional front-end web application allows data requesters to interface with the central repository or central coordination node. This may allow for the exchange of decryption keys from data repositories to data requesters, without keys being accessible to the central server. Otherwise, it may receive encryption keys from the data requester to pass to the data repositories (preferably by way of the central repository or central coordination node), who in turn decrypt output data received from the central coordination node or central repository and re-encrypt with the data requester provided key, returning output data to the data requester (e.g., by way of the central coordination node or central repository), who in turn decrypts final output data with their private key. Financial transactions may be managed through the central coordination node or central repository. Smart contracts may or may not be used to enforce data encryption, decryption, and/or transfer upon fulfillment of pre-determined terms, which may include confirmation of receipt of payment (in any currency or cryptocurrency), approval of query or data request syntax, recognition of data requester authorization and/or credentials, and/or other pre-determined terms.

Optional blockchain integration features may enable historical tracking of ownership and/or viewership of data, automatic encryption and/or decryption triggered by specific events, automated auditing, granular access (granting or revocation) control, federated identity management, or cryptocurrencies enabling buying and selling of marketplace assets without the use of fiat or governmental currencies.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

One non-limiting exemplification of the foregoing is illustrated in FIG. 1, which includes a schematic illustration of a system 10 for exchanging data. In FIG. 1 for example, a data requester may gain access to the central repository 12 through a web application or other application interfacing with a data requester node 14. The central repository 12 includes a first database 16 which includes a sub-database 18 and a sub-database 20. In the illustrated form, the sub-database 18 is representative of an annotation database and the sub-database 20 is representative of a unique variant database. The central repository 12 also includes a second database 22 which includes a sub-database 24 and a sub-database 26. In the illustrated form, the sub-database 24 is representative of a database storing homomorphically encrypted data provided by independent data sources 28, 30 and 32 and the sub-database 26 is representative of a database storing data provided by independent data sources 28, 30 and 32 which is deemed not sensitive. The data in the sub-database 26 may not be encrypted, or it may be encrypted but at a level lower than the data in the sub-database 24. In one form, the homomorphically encrypted data stored in the sub-database 24 may be homomorphically encrypted by the independent data sources 28, 30 and 32 before it is provided by the central repository, although forms in which all or part of this data is homomorphically encrypted following its receipt at the central repository 12 are also possible. Similarly, the data in the sub-database 26, if encrypted, may be encrypted before or after deposit in the central repository The central repository 12 may also include a coordination engine 34, or more generally a processor 34. When the central repository 12 receives data requests from a data requester, the processor 34 may first relay the data requests to the database 16 where the data request or data requests are decomposed into an output set of all possible variants meeting the specified input criteria. This simplified, equivalent data request may then be relayed to the sub-database 24 which may be performance-optimized by storing only linking information between variant and sample identifiers (or between sample and phenotype identifiers). The number of samples harboring variants matching the data requester search criteria, optionally along with pricing information, may then be returned to the data requester, at which point they may decide whether to move forward with purchasing the results. While not previously discussed, in some forms the data request(s) from a data requester provided at the data requester node 14 may be private such that the central repository 12, and the processor 34 thereof, are blind as to the identification of the data requester and/or the contents of the data request(s).

If the data requester elects to purchase (e.g., deems the results relevant to their objectives), the processor 34 may coordinate procuring readable results for the data requester without exposing results to itself, where the results may be from any number of the independent data sources 28, 30 and 32. In some implementations, the central repository 12 may receive a standard public key from the data requester. The homomorphically encrypted results may then be joined with the full variant information stored in the sub-database 26, and both the public key and the results may be sent to the relevant ones of the independent data sources 28, 30 and 32 for decryption (e.g., using decryption keys of the independent data sources 28, 30, 32) and re-encryption using the standard public key. The public key may be used for re-encrypting the results with homomorphic encryption (either full or partial) or other encryption. The re-encrypted results may then be passed through the central repository 12 and delivered to the data requester, e.g., via the data requester node 14, who can decrypt the purchased results with their corresponding private key. The private key used by the data requester is the private key that decrypts data encrypted with the public key provided by the data requester to the central repository. In this and some other implementations, the central repository 12 may be unable to view any sensitive data provided by one or more of the independent data sources 28, 30 and 32 and forwarded to the data requester. Alternatively, the relevant ones of the independent data sources 28, 30 and 32 may each provide a one-time decryption key to the central repository 12 and the central repository 12 may forward the relevant results along with the one-time decryption key of each of the relevant ones of the independent data sources 28, 30 and 32 to the data requester. Alternatively, the relevant ones of the independent data sources 28, 30 and 32 may each provide a one-time decryption key, along with the results relevant to the data request(s), directly to the data requester through the data requester node 14, and/or the one-time decryption key, along with the results relevant to the data request(s), may be provided to an independent third party (outside of the central repository) which may then forward the same on to the data requester.

As another alternative, a data requester may create a public-private key pair and retain the private key. The public key could be forwarded through the data requester node 14 to the central repository 12 where the processor 34 forwards the same public key to one or more of the independent data sources 28, 30 and 32. One or more of the independent data sources 28, 30 and 32 may then issue one-time decryption keys, and those keys may be encrypted with the public key provided by the data requester through the data requester node 14. The one or more of the independent data sources 28, 30 and 32 may forward the encrypted key to the central repository 12, and the processor 34 may forward the encrypted key package(s) to the data requester node 14. The data requester or the data requester node 14 may use the private key to decrypt the key package(s) such that one-time keys are utilized to decrypt the purchased results of the initial data request(s).

Figure 2:
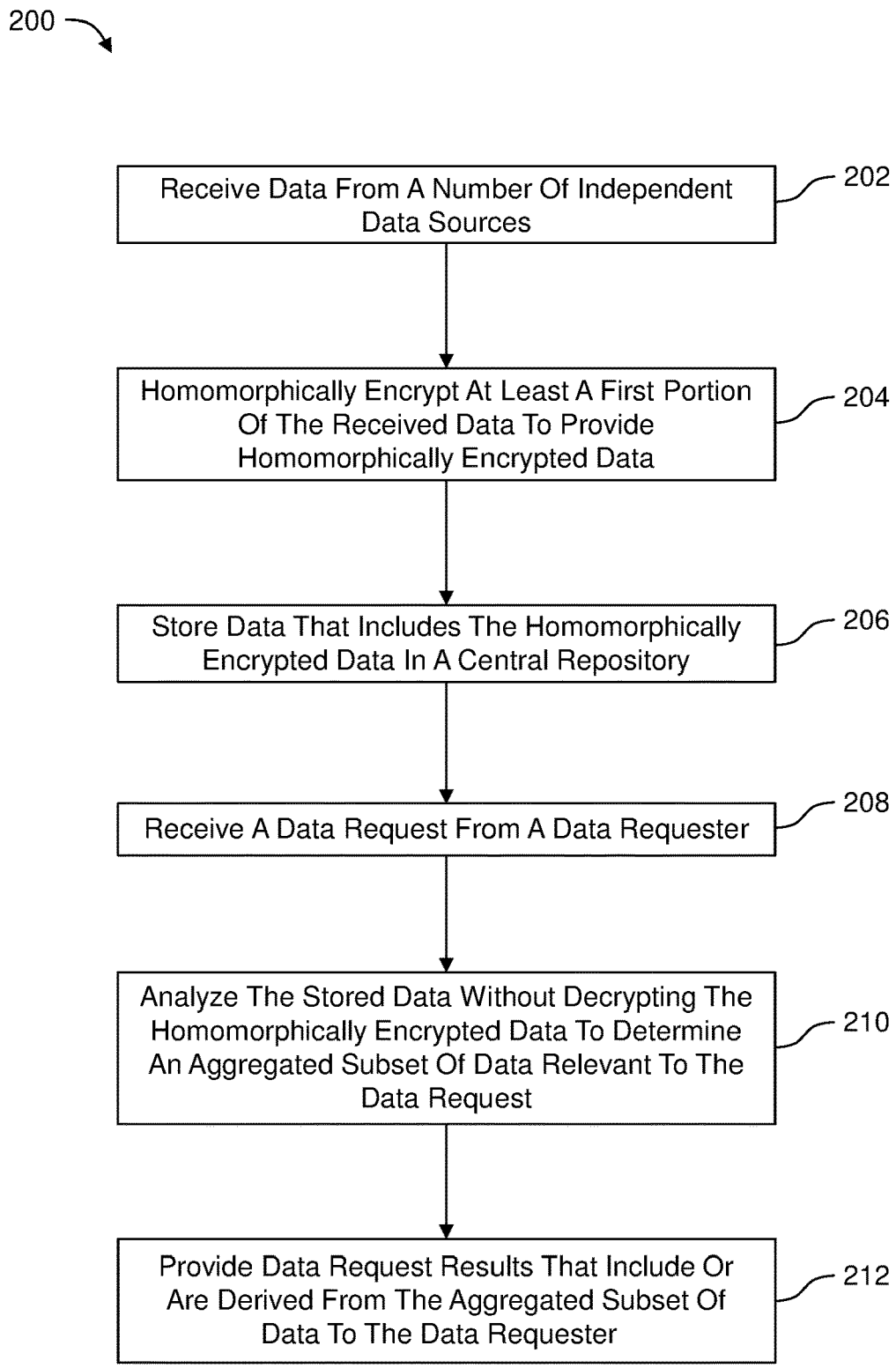
FIG. 2 is a flowchart illustrating an example method of secure data exchange.

FIG. 2 illustrates a flowchart of an example method 200 of secure data exchange. The method 200 may be performed or controlled by any suitable system, apparatus, or device. For example, the central repository 12 or the processor 34 of FIG. 1 may perform or direct performance of one or more of the operations associated with the method 200. The method 200 may include one or more of blocks 202, 204, 206, 208, 210, and/or 212.

At block 202, the method 200 may include receiving data from a number of independent data sources. For example, the central repository 12 of FIG. 1 may receive data from the data sources 28, 30, and/or 32. Block 202 may be followed by block 204.

At block 204, the method 200 may include homomorphically encrypting at least a first portion of the received data to provide homomorphically encrypted data. Block 204 may be followed by block 206. However, in some forms the block 204 may be absent and the number of independent data sources may homomorphically encrypt all or a portion of the data they provide before it is provided. In these forms for example, the sequence of the actions performed at block 202 and block 204 could be, in essence, reversed.

At block 206, the method 200 may include storing data that includes the homomorphically encrypted data in a central repository. For example homomorphically encrypted data of the data sources 28, 30, and/or 32 may be stored in the sub-database 24 and/or their non-sensitive, unencrypted, and/or data encrypted with a lower encryption may be stored in the sub-database 26. Block 206 may be followed by block 208.

At block 208, the method 200 may include receiving a data request from a data requester. For example, the data request may be received by the central repository 12 from and/or through the data requester node 14. Block 208 may be followed by block 210.

At block 210, the method 200 may include analyzing the stored data without decrypting the homomorphically encrypted data to determine an aggregated subset of data relevant to the data request. The aggregated subset of data may include at least some of the homomorphically encrypted data. Alternatively or additionally, the aggregated subset of data may include homomorphically encrypted data obtained by homomorphically encrypting at least some data received from at least two of the data sources. Block 210 may be followed by block 212.

At block 212, the method 200 may include providing results that include or are derived from the aggregated subset of data to the data requester.

In some embodiments, the method 200 may further include receiving a request from the data requester for decryption of the at least some of the homomorphically encrypted data included in the aggregated subset of data. For example, the data requester may request decryption of the homomorphically encrypted data included in the aggregated subset of data after seeing a purchase price. The method 200 may further include providing a decryption key from at least one of the independent data sources to the data requester. The aggregated subset of data may include at least some data from the at least one independent data source that has been homomorphically encrypted and/or the decryption key may include a one-time decryption key.

Alternatively or additionally, the method 200 may further include identifying the independent data sources having homomorphically encrypted data in the aggregated subset of data and notifying the identified independent data sources of the request from the data requester. The identified independent data sources may be notified by sending their respective homomorphically encrypted data to each independent data source. The method 200 may further include receiving re-encrypted data from the identified independent data sources. The re-encrypted data may have the homomorphic encryption removed and may be re-encrypted with a public encryption key provided by the data requester such that the data requester may receive and decrypt the re-encrypted data using a corresponding private key of the data requester. The results provided to the data requester may include the re-encrypted data in this and/or other implementations.

In some implementations, the method 200 may further include running one or more indexing queries or analysis to identify one or more locations of certain homomorphically encrypted data stored in the central repository and storing the one or more locations. Alternatively or additionally, the method 200 may further include identifying the one or more locations when the data request from the data requester is the same or similar to the one or more indexing queries. This may result in quicker data request results.

In some implementations, the method 200 may further include non-homomorphically encrypting or partially homomorphically encrypting at least a second portion of the data received from the independent data sources. Alternatively, the independent data sources may non-homomorphically encrypt or partially homomorphically encrypt at least a second portion of its respective data before it is provided. By way of example, less sensitive data may be non-homomorphically encrypted or partially homomorphically encrypted. Thus, the first portion of the data received from the independent data sources may have a higher sensitivity level than the second portion of the data received from the independent data sources.

In some implementations, the method 200 may further include identifying from the data request received from the data requester one or more types of data to be identified from the stored data and analyzing the stored data to determine if the one or more types of data is included therein. The one or more types of data to be identified from the stored data may include one or more genetic variants and analyzing the stored data may include determining if the homomorphically encrypted data includes any instances of the one or more genetic variants.

In some implementations, the stored data may include genomic data and/or phenotypic data. Alternatively or additionally, the stored data includes information relating to physical assets for sale.

Figure 3:
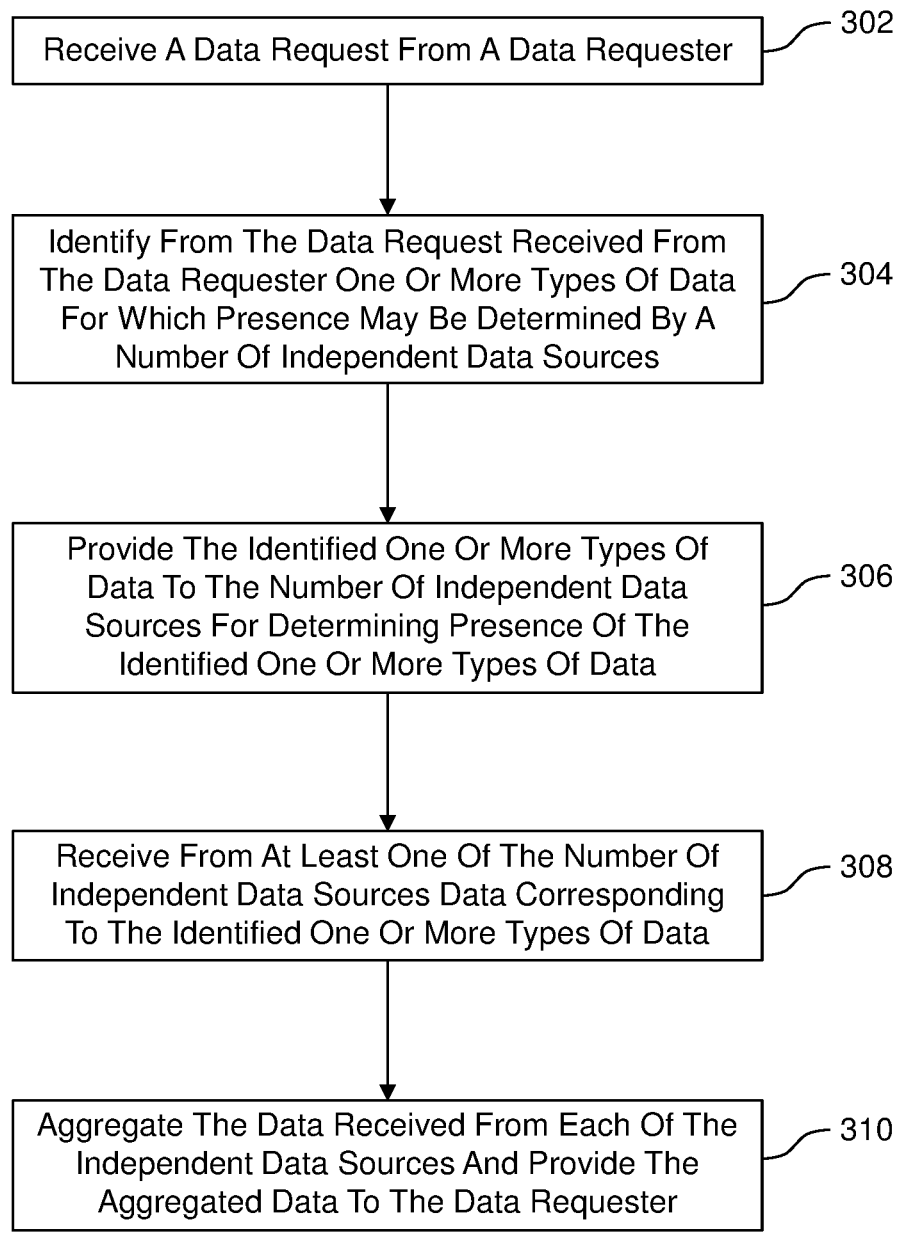
FIG. 3 is a flowchart illustrating an alternative example method of secure data exchange.

FIG. 3 illustrates a flowchart of another example method 300 of secure data exchange. The method 300 may be performed or controlled by any suitable system, apparatus, or device. For example, the central repository 12 or the processor 34 of FIG. 1 may perform or direct performance of one or more of the operations associated with the method 300. The method 300 may include one or more of blocks 302, 304, 306, 308, and/or 310.

At block 302, the method 300 may include receiving a data request from a data requester. For example, the data request may be received by the central repository 12 from and/or through the data requester node 14. Block 302 may be followed by block 304.

At block 304, the method 300 may include identifying from the data request received from the data requester one or more types of data for which presence may be determined by a number of independent data sources. Block 304 may be followed by block 306.

At block 306, the method 300 may include providing the identified one or more types of data to the number of independent data sources for determining presence of the identified one or more types of data. Block 306 may be followed by block 308.

At block 308, the method 300 may include receiving from at least one of the independent data sources data corresponding to the identified one or more types of data. Block 308 may be followed by block 310.

At block 310, the method 300 may include aggregating the data received from each of the independent data sources and providing the aggregated data to the data requester.

In some implementations, the one or more types of data to be identified from the data request includes a genetic variant. Alternatively or additionally, the data received from the at least one of the number of independent data sources includes instances of the genetic variant, or additional genetic data, phenotypic data, or other metadata associated with samples or individuals identified as possessing the genetic variant.

Figure 4:
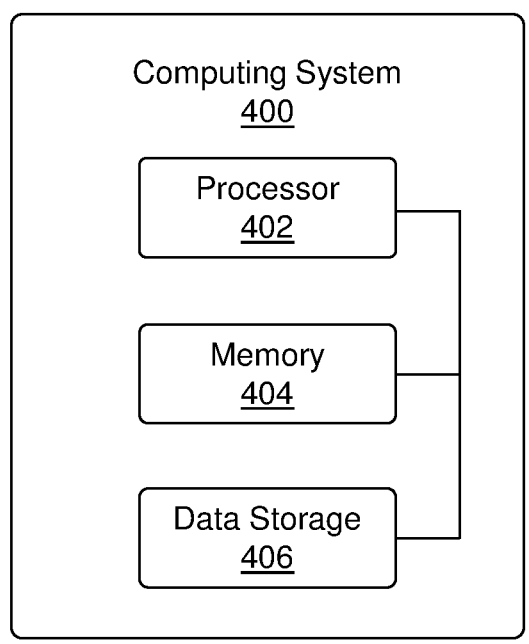
FIG. 4 illustrates an example computing system.

FIG. 4 illustrates a block diagram of an example computing system 400. The computing system 400 may be configured according to at least one embodiment of the present disclosure and may be an example of computing systems that may include or be part of one or more elements of the system 10 of FIG. 1. For example, system 10 may include one or more computing systems 400. The computing system 400 may include a processor 402, a memory 404, and a data storage 406. The processor 402, the memory 404, and the data storage 406 may be communicatively coupled. The processor 402 may include, be included in, or correspond to the processor 34 of FIG. 1, and the data storage 406 may include, be included in, or correspond to one or both of the databases 16, 22 of FIG. 1.

In general, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 402 may include any number of processors configured to, individually or collectively, perform or direct performance of any number of operations described in the present disclosure. Additionally, one or more of the processors may be present on one or more different electronic devices, such as different servers.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

The memory 404 and the data storage 406 may include computer-readable storage media for carrying or having computer-executable instructions or data structures stored thereon. Such computer-readable storage media may include any available media that may be accessed by a general-purpose or special-purpose computer, such as the processor 402. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Modifications, additions, or omissions may be made to the computing system 400 without departing from the scope of the present disclosure. For example, in some embodiments, the computing system 400 may include any number of other components that may not be explicitly illustrated or described.

For instance, in some embodiments, the computing system 400 may include a communication unit that includes any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the system 400 to communicate with other systems, such as computing devices and/or other networks.

Additionally or alternatively, the computing system 400 may include one or more user interfaces in some embodiments. The user interfaces may include any system or device to allow a user to interface with the system 400. For example, the interfaces may include a mouse, a track pad, a keyboard, and/or a touchscreen, among other devices or systems. The interfaces may also include a graphical user interface that may be presented on a display that may be included with the computing system 400. The display may be configured as one or more displays, like an LCD, LED, or other type of display. The display may be configured to present content such as video, text, user interfaces, and other data as directed by the processor.

As indicated above, the embodiments described in the present disclosure may include the use of a special purpose or general purpose computer (e.g., the processor 402 of FIG. 4) including various computer hardware or software modules, as discussed in greater detail below. Further, as indicated above, embodiments described in the present disclosure may be implemented using computer-readable media (e.g., the memory 404 or data storage 406 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In some implementations, data from independent sources may be first encrypted with homomorphic encryption prior to aggregation in a central repository. For example, the independent sources may encrypt the data before forwarding it to the central repository, and the encryption may involve fully homomorphic encryption or partial homomorphic encryption. Queries or analyses against the aggregate data received from a data requester may be performed without decrypting the data. The encrypted result is then delivered to the data requester, and one-time decryption keys are passed from the independent data source(s) to the data requester.

As an alternative to one-time decryption keys, the aggregate encrypted result may also be subdivided according to the source of each encrypted output data entry. In this case, the encrypted results may be returned to each respective independent data source holding a key for the relevant encrypted data, which will in turn decrypt the results, encrypt the results with a public key provided by the data requester, and securely return the encrypted result to the central repository for forwarding to the data requester, who can decrypt with their private key.

In another embodiment, with or without utilizing homomorphic encryption, a central node or central repository receives inbound data requests from one or more data requesters, translates the data requests into a set of all possible resulting data, and passes the modified data requests to one or more independent data sources or repositories. The independent data sources or repositories then execute and log the data requests, and each independently return their results to the central node, which in turn returns aggregate results to the data requester. If genomic data is involved for example, input filter-based data requests of genomic annotation parameters may first query or analyze an aggregate set of all possible variants (whether universal or specific to a given data set) at the central node. This initial data request is then translated into a set of all possible genomic variants matching input criteria. Individual data sources are then queried as to whether they contain any samples harboring genetic variants in the intermediate set. Results are likewise first returned to the central node prior to aggregate analysis and return of results to data requester.

In another embodiment, the subject matter disclosed herein may be used in instances where a vendor may list physical assets for sale (such as tissue samples, with or without any associated metadata) without divulging inventory (or any associated metadata) to external parties other than the purchaser for any given specific transaction. Metadata cataloguing inventory contents is aggregated into the context of a search service that may search the inventory contents (or associated metadata) of one or many vendors. Data requesting parties may search across the system (using any combination of specific, general, or artificial intelligence-generated criteria) for specific assets or categories of assets, retrieving information as to whether such assets exist within the searchable system at large. Pricing information for purchasing any such assets resulting from a data request (with or without associated metadata) may be provided to the data requesting party. In the event a decision to purchase is made, a transaction is facilitated, and fulfillment of the purchased assets (with or without associated metadata) may be arranged such that no third parties (including any potential centralized search system service providers) become aware of the specific contents of the purchase (and/or any associated metadata).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:
1. A method, comprising:
  receiving data from a plurality of independent data sources;
  storing the data in a central repository;

homomorphically encrypting, prior to receiving a data request from a data requester, at least a first portion of the stored data in the central repository, wherein the first portion of the stored data includes data from at least two of the plurality of independent data sources;

receiving the data request from the data requester;

analyzing the stored data without decrypting the homomorphically encrypted data to determine an aggregated subset of data relevant to the data request, the aggregated subset of data comprising at least some of the homomorphically encrypted data; and providing data request results that include or are derived from the aggregated subset of data to the data requester.

2. The method of claim 1, further comprising receiving a decryption request from the data requester for decryption of the at least some of the homomorphically encrypted data included in the aggregated subset of data.

3. The method of claim 2, further comprising providing a decryption key from at least one of the plurality of independent data sources to the data requester.

4. The method of claim 3, wherein the aggregated subset of data includes at least some data from the at least one independent data source that has been homomorphically encrypted.

5. The method of claim 3, wherein the decryption key is a one-time decryption key.

6. The method of claim 2, further comprising identifying the independent data sources having homomorphically encrypted data in the aggregated subset of data and notifying the identified independent data sources of the data request.

7. The method of claim 6, further comprising receiving re-encrypted data from the identified independent data sources, the re-encrypted data being re-encrypted with a public encryption key provided by the data requester.

8. The method of claim 7, wherein the data request results provided to the data requester comprise the re-encrypted data.

9. The method of claim 7, wherein the data request results provided to the data requester are derived from the re-encrypted data.

10. The method of claim 1, further comprising running one or more cache queries to identify one or more locations of certain homomorphically encrypted data stored in the central repository and storing the one or more locations.

11. The method of claim 10, further comprising identifying the one or more locations when the data request from the data requester is the same or similar to the one or more cache queries.

12. The method of claim 1, wherein at least a second portion of the data received from the plurality of independent data sources is encrypted.

13. The method of claim 12, wherein the first portion of the data received from the plurality of independent data sources has a different sensitivity level than the second portion of the data received from the plurality of independent data sources.

14. The method of claim 1, further comprising identifying from the data request received from the data requester one or more types of data to be identified from the stored data and analyzing the stored data to determine if the one or more types of data is included therein.

15. The method of claim 14, wherein the one or more types of data to be identified from the stored data includes at least one type of genomic data, at least one type of phenotypic data, or a combination of at least one type of genomic data and at least one type of phenotypic data, and analyzing the stored data includes determining if the homomorphically encrypted data includes any instances of the at least one type of genomic data, the at least one type of phenotypic data, or a combination of at least one type of genomic data and at least one type of phenotypic data.

16. The method of claim 15, wherein the at least one type of genomic data includes a genetic variant.

17. The method of claim 15, wherein the at least one type of phenotypic data includes one or more of demographic information, electronic health record data and derivatives thereof, medical diagnostic codes, billing codes, terms from computational ontologies, patient-reported data, automatically generated data from health wearables or sensors, family history data, and medical imaging raw data or downstream derivative features thereof.

18. The method of claim 1, wherein the stored data includes information relating to physical assets for sale.

19. The method of claim 1, wherein the stored data includes at least one type of phenotypic data, the phenotypic data including one or more of demographic information, electronic health record data and derivatives thereof, medical diagnostic codes, billing codes, terms from computational ontologies, patient-reported data, automatically generated data from health wearables or sensors, family history data, and medical imaging raw data or downstream derivative features thereof.

20. The method of claim 1, wherein the stored data includes financial information, the financial information including health insurance information, billing information, account balance information, credit information, credit score information, payment information, or any combination of the foregoing.

21. The method of claim 1, wherein the stored data includes at least one type of genomic data.

22. A system comprising:

one or more processors; and one or more non-transitory computer-readable media containing instructions which, in response to being executed by the one or more processors, cause the system to perform or control performance of operations comprising:

receiving data from a plurality of independent data sources;

storing the data in a central repository;

homomorphically encrypting, prior to receiving a data request from a data requester, at least a first portion of the stored data in the central repository, wherein the first portion of the stored data includes data from at least two of the plurality of independent data sources;

receiving the data request from the data requester;

analyzing the stored data without decrypting the homomorphically encrypted data to determine an aggregated subset of data relevant to the data request, the aggregated subset of data comprising at least some of the homomorphically encrypted data; and providing data request results that include or are derived from the aggregated subset of data to the data requester.

23. The system of claim 22, wherein the stored data includes genomic data, phenotypic data, financial data, information relating to physical assets for sale, or any combination thereof.

24. One or more non-transitory computer-readable media containing instructions which, in response to being executed by one or more processors, cause a system to perform or control performance of operations comprising:

receiving data from a plurality of independent data sources;

storing the data in a central repository;

homomorphically encrypting, prior to receiving a data request from a data requester, at least a first portion of the stored data in the central repository, wherein the first portion of the stored data includes data from at least two of the plurality of independent data sources;

receiving the data request from the data requester;

analyzing the stored data without decrypting the homomorphically encrypted data to determine an aggregated subset of data relevant to the data request, the aggregated subset of data comprising at least some of the homomorphically encrypted data; and providing data request results that include or are derived from the aggregated subset of data to the data requester.

\* \* \* \* \*